(12) United States Patent
Usami

(10) Patent No.: US 6,639,892 B2
(45) Date of Patent: Oct. 28, 2003

(54) OPTICAL DATA RECORDING MEDIUM EXCELLENT IN RECORDING SENSITIVITY AND RECORDING PROPERTY

(75) Inventor: Yoshihisa Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 83 days.

(21) Appl. No.: 09/870,653

(22) Filed: Jun. 1, 2001

(65) Prior Publication Data
US 2002/0006105 A1 Jan. 17, 2002

(30) Foreign Application Priority Data
Jun. 2, 2000 (JP) ......................................... 2000-166751

(51) Int. Cl.$^7$ ................................................. G11B 7/24
(52) U.S. Cl. ................................. 369/275.4; 369/275.1; 428/64.4
(58) Field of Search .......................... 369/275.4, 275.1, 369/277, 283, 275.2, 275.3, 288; 428/64.4, 64.3, 64.2, 64.1, 694 ML, 694 EC, 694 MM

(56) References Cited

U.S. PATENT DOCUMENTS

| | | | |
|---|---|---|---|
| 5,341,362 A | * | 8/1994 | Fujii |
| 5,696,758 A | * | 12/1997 | Yanagimachi et al. |
| 5,763,037 A | * | 6/1998 | Ohtomo et al. |
| 6,028,836 A | * | 2/2000 | Kosuda |
| 6,341,122 B1 | * | 1/2002 | Usami et al. |
| 6,452,899 B1 | * | 9/2002 | Fujii et al. |

\* cited by examiner

*Primary Examiner*—Ali Neyzari
(74) *Attorney, Agent, or Firm*—Sughrue Mion, PLLC

(57) ABSTRACT

The present invention provides an optical data recording medium excellent in recording sensitivity and recording property (jitter). On a transparent substrate, in which a pre-groove having a depth of 20 to 100 nm is formed, a dye recording layer is formed to have a thickness at a groove portion of 50 to 160 nm and a thickness at a land portion of at least 80% of the thickness at the groove portion.

20 Claims, 3 Drawing Sheets

OPTICAL DATA RECORDING MEDIUM EXCELLENT IN RECORDING SENSITIVITY AND RECORDING PROPERTY

BACKGROUND OF THE INVENTION

1. Field of the Invention

The present invention relates to an optical data recording medium, and more particularly to an optical data recording medium of a write-once type, which can perform recording and reproduction of data using laser light.

2. Description of the Related Art

Conventionally, a write-once optical data recording medium (optical disc) which can be recorded with data by laser light only once is called a CD-R, and is widely known. This CD-R type optical data recording medium typically has a structure in which a guide groove (pre-groove) is formed in a disc-shaped transparent substrate for tracking of laser light that irradiates during recording, and a dye recording layer composed of an organic dye, a light reflection layer made of a metal such as gold or the like and, further, a resin-like protective layer are laminated onto the substrate in that order. For recording data on this optical disc, the optical disc is irradiated with laser light in the near-infrared region (usually, laser light having a wavelength around 780 nm), irradiated parts of the dye recording layer absorb the light and locally increase in temperature, optical properties of these parts change due to physical or chemical changes (for example, formation of pits or the like), and data is recorded. On the other hand, for reproduction of data, usually, the optical disc is irradiated with laser light having the same wavelength as that of the laser light for recording, and a difference in reflectance between regions of the dye recording layer having changed optical properties (the recorded parts) and regions having unchanged optical properties (non-recorded parts) is detected.

However, CD-R is a medium whose premise is a system in which data is recorded by a user using a simple recording apparatus. Therefore, accuracy in forming pits is lower with CD-R than in the case of a ROM-type medium. Consequently, there is a problem in that irregularity in pit length, called jitter, increases and poor reproduction, for example, in the case of a decrease in reproduction accuracy of a reproduction apparatus or the like occurs.

SUMMARY OF THE INVENTION

The present inventors have intensively studied various methods for ameliorating jitter to solve the above-mentioned problem, and resultantly have found that jitter is ameliorated by decreasing the thickness of a dye recording layer. However, there is a problem in that simply decreasing the thickness of the dye recording layer reduces recording sensitivity.

The present invention has been made in view of the above-mentioned conditions, and an object of the present invention is to provide an optical data recording medium having excellent recording sensitivity and recording property (jitter).

For attaining the above-mentioned object, the optical data recording medium of the present invention has a transparent substrate in which a pre-groove having a depth of 20 to 100 nm is formed, and a dye recording layer, which is formed on the substrate and which has a thickness at a groove portion of 50 to 160 nm, has a thickness at a land portion of 80% or more of the thickness at the groove portion, and includes organic dye which enables recording of data.

In the optical data recording medium of the present invention, even if the thickness of the dye recording layer is as small as 50 to 160 nm, data can be recorded with excellent recording sensitivity and excellent jitter can be obtained, because the depth of the pre-groove formed on the transparent substrate is from 20 to 100 nm and the thickness at the land portion is 80% or more of the thickness at the groove portion, such that a difference between the thickness at the land portion and the thickness at the groove portion is small.

In the above-described optical data recording medium, the depth of the pre-groove is preferably from 30 to 90 nm, and more preferably from 40 to 80 nm. The width of the pre-groove is preferably from 400 to 630 nm, more preferably from 420 to 600 nm, and particularly preferably from 450 to 580 nm. An extinction coefficient k of the dye recording layer at a laser recording wavelength is preferably from 0.05 to 0.15, more preferably from 0.06 to 0.12, and particularly preferably from 0.07 to 0.10. The thickness of the dye recording layer at the groove portion is preferably from 70 to 150 nm, and more preferably from 80 to 140 nm. The thickness at the land portion is more preferably 90% or more of the thickness at the groove portion, and it is particularly preferable if the thickness at land portions is substantially the same as the thickness at groove portions.

The optical data recording medium of the present invention can be produced by applying an application solution having a dye concentration of from 0.5 to 1.5 g/100 ml onto the surface of the transparent substrate, at the side thereof at which the pre-groove is formed, to form a coating film, and drying the thus-formed coating film.

In the above-mentioned production method, it is preferable to use, as an application solvent, a mixed solvent prepared by mixing a main solvent, which may be a fluorine-based solvent such as 2,2,3,3-tetrafluoropropanol or the like or an alcohol solvent such as ethanol, n-propanol, isopropanol, n-butanol, diacetone alcohol or the like, with a glycol ether such as ethylene glycol monomethyl ether (methyl cellosolve), ethylene glycol monoethyl ether (ethyl cellosolve), ethylene glycol monopropyl ether, propylene glycol monomethyl ether, propylene glycol monoethyl ether, propylene glycol monopropyl ether, methylene glycol monomethyl ether, methylene glycol monoethyl ether, methylene glycol monopropyl ether and the like. By use of such a mixed solvent, a coating film having uniform thickness can be formed with the above-mentioned application solution having a dye concentration of from 0.5 to 1.5 g/100 ml.

As an application method, a spin coating method is preferable. In the case of formation of the dye recording layer by the spin coating method, the amount of the application solution fed is preferably from 0.1 to 1.0 ml per disc, and the speed of rotation during supply of the application solution is preferably from 100 to 500 rpm. After the application solution has been supplied, drying is conducted while the speed of rotation gradually increases. The speed of rotation during drying is preferably from 1500 to 8000 rpm, and the acceleration in increasing the speed of rotation is preferably in a range from 10 to 3000 rpm/s. The time required from commencement of application to termination of drying is preferably in the range from 3 to 15 seconds. If this time is too short, uniform film thickness distribution can not be obtained, and if too long, productivity decreases.

In the optical data recording medium of the present invention, a light reflection layer is preferably provided on the dye recording layer. The protective layer is preferably provided on the surface at a side of the dye recording layer which is opposite to the side at which the substrate is provided.

DESCRIPTION OF THE PREFERRED EMBODIMENTS

An embodiment of an optical data recording medium of the present invention will be explained in detail below.

Figure 1:
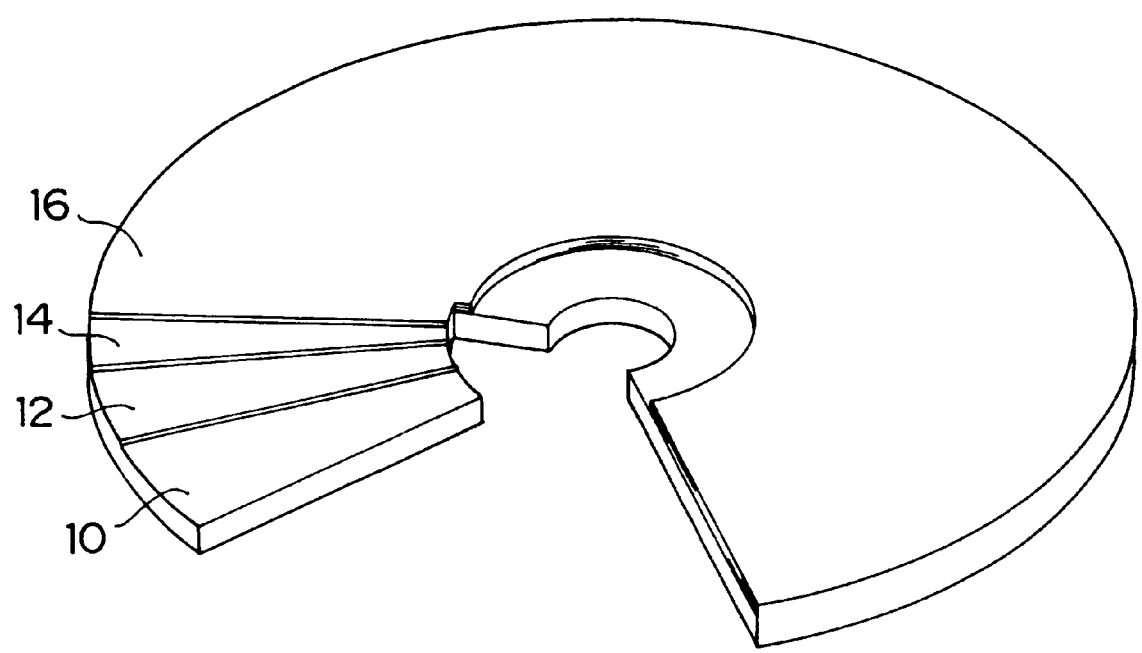
FIG. 1 is a schematic constitutional view showing a laminar structure of a CD-R type optical data recording medium relating to an embodiment of the present invention.

A CD-R type optical data recording medium relating to the embodiment of the present invention has a structure, as shown in FIG. 1, in which a dye recording layer 12, a light reflection layer 14 and a protective layer 16 are provided in that order on a disc-shaped transparent substrate 10 which has a center hole formed at a central portion. Further, as described later, intermediate layers and the like may also be provided as necessary.

The present invention is characterized in that: (1) the depth of a pre-groove formed on the transparent substrate is from 20 to 100 nm, (2) the thickness of the dye recording layer at a groove portion thereof is from 50 to 160 nm, and (3) the thickness of the dye recording layer at a land portion thereof is 80% or more of the thickness at the groove portion. By satisfying the three conditions (1) to (3), excellent recording sensitivity and excellent recording property (jitter) can both be achieved.

The constitutions of respective layers will be explained in detail below.

Figure 2:
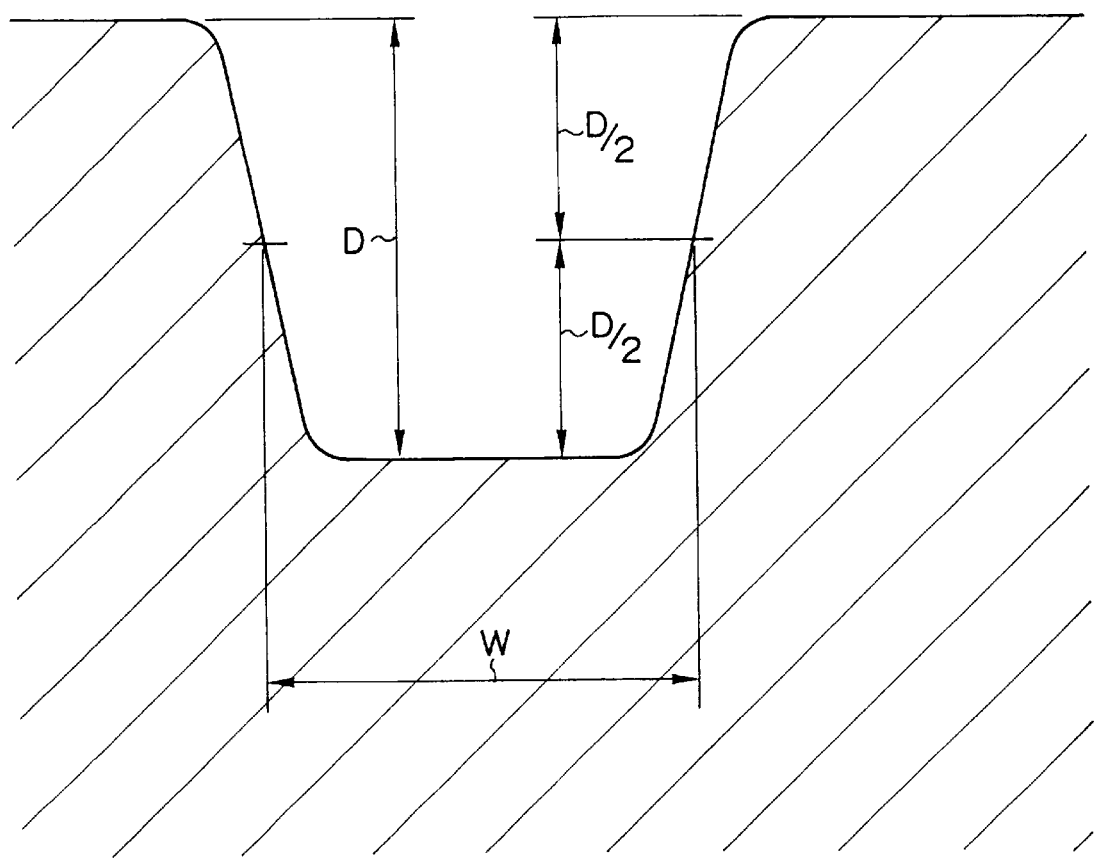
FIG. 2 is a schematic sectional view showing the form of a pre-groove.

On the transparent substrate 10, grooves for tracking, grooves representing data such as address signals and the like are formed with a predetermined track pitch. FIG. 2 is a schematic sectional view showing the form of a pre-groove. D represents the depth of the groove, and is a distance from the surface of the substrate, before formation of the groove, to the deepest position of the groove. W represents the groove width, and is the width of the groove at a depth of D/2.

In the present invention, it is necessary that the depth of the pre-groove, represented by "D" in FIG. 2, is from 20 to 100 nm. If the groove depth was less than 20 nm, poor tracking would occur. On the other hand, if the groove depth was over 100 nm, it would be difficult to form a dye recording layer having uniform thickness.

Formation of the dye recording layer having uniform thickness becomes more difficult as groove depth increases. Therefore, in view of a balance between a degree of occurrence of poor tracking and ease of forming the dye recording layer, if the upper limit of groove depth is 100 nm, the lower limit of groove depth is more preferably 30 nm, and further preferably 40 nm, and if the lower limit of groove depth is 20 nm, the upper limit of groove depth is more preferably 90 nm, and further preferably 80 nm. Further, if the upper limit of the groove depth is 90 nm, the lower limit of the groove depth is more preferably 30 nm, and further preferably 40 nm, and if the lower limit of the groove depth is 30 nm, the upper limit of the groove depth is more preferably 90 nm, and further preferably 80 nm. Furthermore, if the upper limit of the groove depth is 80 nm, the lower limit of the groove depth is more preferably 30 nm, and further preferably 40 nm, and if the lower limit of the groove depth is 40 nm, the upper limit of the groove depth is more preferably 90 nm, and further preferably 80 nm.

The width of the pre-groove, represented by "W" in FIG. 2, is preferably from 400 to 630 nm. If groove width is less than 400 nm or over 630 nm, a tendency for jitter to deteriorate will be observed. If the upper limit of groove width is 630 nm, in order to suppress occurrence of tracking errors, the lower limit of groove width is more preferably 420 nm, and further preferably 450 nm. If the lower limit of the groove width is 400 nm, to suppress occurrence of crosstalk, the upper limit of the groove width is more preferably 600 nm, and further preferably 580 nm.

Further, if the upper limit of the groove width is 600 nm, the lower limit of the groove width is more preferably 420 nm, and further preferably 450 nm, and if the lower limit of the groove width is 420 nm, the upper limit of the groove width is more preferably 600 nm, and further preferably 580 nm. Furthermore, if the upper limit of the groove width is 580 nm, the lower limit of the groove width is more preferably 420 nm, and further preferably 450 nm, and if the lower limit of the groove width is 450 nm, the upper limit of the groove width is more preferably 600 nm, and further preferably 580 nm.

The track pitch of pre-grooves is preferably from 0.1 to 50 μm, more preferably from 0.2 to 30 μm, and further preferably from 0.3 to 10 μm.

The transparent substrate 10 is a substrate made of transparent resin in the form of a disc. Disc-shaped substrates having a diameter of 120±3 mm and a thickness of 0.6±0.1 mm or having a diameter of 80±3 mm and a thickness of 0.6±0.1 mm are generally used. "Transparent" as herein referred to means transparent with respect to recording light and reproduction light.

As the material of the transparent substrate 10, examples include glass; polycarbonates; acrylic resins such as polymethyl methacrylate and the like; vinyl chloride-based resins such as polyvinyl chloride, vinyl chloride copolymer and the like; epoxy resins; and amorphous polyolefins and polyesters and the like. Further, these may be combined as necessary. Among the above-mentioned materials, polycarbonates are preferable from the standpoints of moisture resistance, dimensional stability, cost and the like.

The above-mentioned pre-groove having a predetermined form can be formed directly in the transparent substrate 10 when a resin material such as a polycarbonate or the like is injection-molded or extrusion-molded. Further, formation of the pre-groove may also be effected by providing a pre-groove layer. As a material for the pre-groove layer, a mixture of at least one kind of monomer (or oligomer), among mono-, di-, tri- and tetraesters of acrylic acid, with a photopolymerization initiator can be used. For formation of the pre-groove layer, for example, the above-mentioned mixture composed of an acrylate and the polymerization initiator is first applied to a precisely produced mother shape (stamper), and the substrate is further placed on this application solution layer. Then, the applied layer is hardened by irradiation with ultraviolet radiation via the substrate or the mother shape, to fix the substrate to the applied layer. Then, the substrate can be stripped from the mother shape to obtain the pre-groove. The thickness of the pre-groove layer is generally in a range from 0.05 to 100 μm, and preferably from 0.1 to 50 μm.

A primer layer can be provided at the side of the transparent substrate 10 at which the dye recording layer 12 is to be provided, for purposes of improving flatness, increasing adhesive force and preventing deterioration of the dye recording layer. Examples of material of the primer layer include polymer substances such as polymethyl methacrylate, acrylic acid-methacrylic acid copolymer, styrene-maleic anhydride copolymer, polyvinyl alcohol, N-methylolacrylamide, styrene-vinyltoluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, polycarbonate and the like; surface modifiers such as silane coupling agents; and the like. The primer layer can be formed by dissolving or dispersing the above-mentioned substances in a suitable solvent to prepare an application solution, and applying this application solution onto the surface of the substrate utilizing an application method such as spin coating, dip coating, extrusion coating or the like. The thickness of the primer layer is usually in a range from 0.005 to 20 $\mu$m, and preferably in a range from 0.01 to 10 $\mu$m.

On the surface of the transparent substrate 10 in which the pre-groove is formed (or primer layer), the dye recording layer 12, which, because of the inclusion of organic dye, can effect recording of data is provided. The dye recording layer 12 may be a single layer or a plurality of layers.

In the present invention, it is preferable that the organic dye to be included is selected such that an extinction coefficient k of this dye recording layer 12 at a recording laser wavelength is in a range from 0.05 to 0.15. If this extinction coefficient k is less than 0.05, recording sensitivity will decrease, and if the extinction coefficient k is over 0.15, reflectance of recording light and reproduction light will decrease.

Since recording sensitivity and reflectance are in opposition to each other as described above, if an upper limit of the extinction coefficient k is 0.15, a lower limit of the extinction coefficient k is more preferably 0.06, and further preferably 0.07, and if the lower limit of the extinction coefficient k is 0.05, the upper limit of the extinction coefficient k is more preferably 0.12, and further preferably 0.10. Further, if the upper limit of the extinction coefficient k is 0.12, the lower limit of the extinction coefficient k is more preferably 0.06, and further preferably 0.07, and if the lower limit of the extinction coefficient k is 0.06, the upper limit of the extinction coefficient k is more preferably 0.12, and further preferably 0.10. Furthermore, if the upper limit of the extinction coefficient k is 0.10, the lower limit of the extinction coefficient k is more preferably 0.06, and further preferably 0.07, and if the lower limit of the extinction coefficient k is 0.07, the upper limit of the extinction coefficient k is more preferably 0.12, and further preferably 0.10.

The extinction coefficient k of the dye recording layer is the absolute value of an imaginary part of a complex refractive index of the dye recording layer for the recording laser wavelength, and is used as an index of a light absorption coefficient. In the present invention, the extinction coefficient k refers to a value obtained according to the following method from measured values of transmittance and reflectance of the dye recording layer for the recording laser wavelength.

The extinction coefficient k is generally represented by the following formula (1) using an absorption factor $\alpha$.

$$k = \alpha\lambda/4\pi \qquad \text{formula (1)}$$

(wherein 80 represents the recording laser wavelength)

An optical density $\alpha_d$, which is the product of the absorption factor $\alpha$ and a film thickness d of the dye recording layer, can be obtained according to the following formula (2) using transmittance $T_0$ and reflectance $R_0'$ for light incident from the dye recording layer side, reflectance $R_0$ for light incident from the side of the substrate that is opposite to the dye recording layer side, and reflectance $R_s$ of the substrate alone. These values are actually measured.

$$\alpha_d = 1n(1/T_0) + 1n(1-R_0) + 1n(1-R_0'+\tfrac{1}{2}R_s) \qquad \text{formula (2)}$$

Therefore, the extinction coefficient k of the dye recording layer for the recording laser wavelength can be calculated with the following formula (3), which is obtained by substituting formula (2) into formula (1).

$$k = \lambda[1n(1/T_0)+1n(1-R_0)+1n(1-R_0'+\tfrac{1}{2}R_s)]/4\pi d \qquad \text{formula (3)}$$

The reflectance $R_s$ of the substrate alone is reflectance at a region of the recording medium that has no dye recording layer.

The dye is appropriately selected from cyanine-based dyes, azo-based dyes, phthalocyanine-based dyes, oxonol-based dyes, pyromethene-based dyes and the like such that the extinction coefficient k of the dye recording layer has a given value. Further, these dyes may also be suitably combined and used such that the extinction coefficient k of the dye recording layer has the given value.

Figure 3:
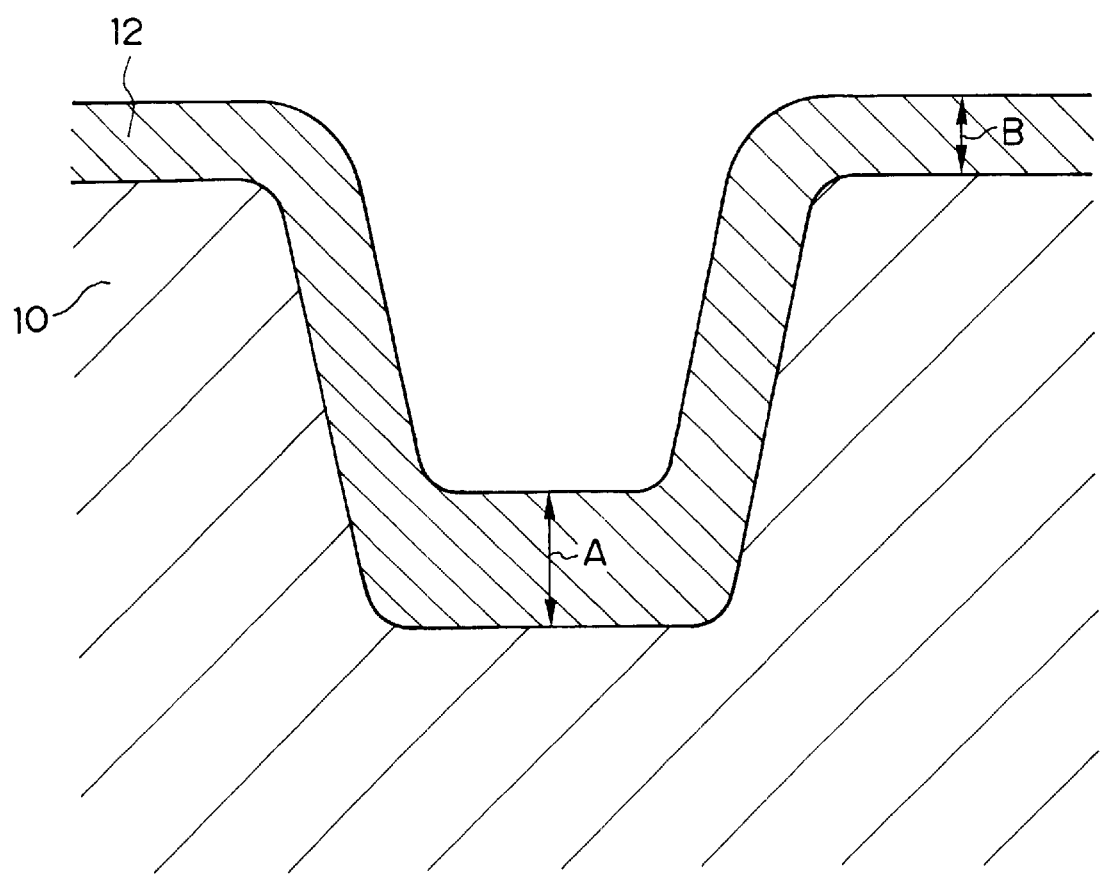
FIG. 3 is a schematic sectional view showing the form of a dye recording layer.

Further, in the present invention, it is necessary that the thickness of the dye recording layer at the groove portion is in the range from 50 to 160 nm. FIG. 3 is a schematic sectional view showing the form of the dye recording layer 12 provided on the surface of the transparent substrate 10. In the present invention, "thickness of the dye recording layer at the groove portion" means the thickness of the dye recording layer at a region at which a groove is formed (the groove portion). As represented by "A" in FIG. 3, the thickness of the dye recording layer at the groove portion is the distance, at the region at which the groove is formed, from a surface of the dye recording layer to a deepest position of the groove. On the other hand, "thickness of the dye recording layer at the land portion" means the thickness, at a region at which the groove is not formed (the land portion), of the dye recording layer, which is represented by "B" in FIG. 3. The thickness of the dye recording layer at the land portion is the distance, at the region at which the groove is not formed, from the surface of the dye recording layer to the surface of the substrate.

Conventionally, it has been usual that a dye recording layer is formed with a thickness of about 200 nm in a groove, and that the thickness at a groove portion is about two to three times the thickness at the land portion. The present invention is characterized in that the thickness of the dye recording layer is from 50 to 160 nm, which is less than that of a conventional CD-R, and the thickness at the land portion is 80% or more of the thickness at the groove portion. Thus, a difference between the thickness at the land portion and the thickness at the groove portion is small. If the thickness at the groove portion is less than 50 nm, sensitivity will decrease, leading to inability to record. On the other hand, if the thickness at the groove portion is over 160 nm, jitter will increase, causing a decrease in recording and reproduction properties. If the thickness at the land portion is less than 80% of the thickness at the groove portion, recording sensitivity will decrease and jitter will increase.

Since recording sensitivity and jitter are in opposition, as described above, if an upper limit of the thickness at the groove portion is 160 nm, a lower limit of the thickness at the groove portion is more preferably 70 nm, and further preferably 90 nm, and if the lower limit of the thickness at the groove portion is 50 nm, the upper limit of the thickness at the groove portion is more preferably 150 nm, and further preferably 140 nm. Further, if the upper limit of the thickness at the groove portion is 150 nm, the lower limit of the thickness of the groove portion is more preferably 70 nm, and further preferably 90 nm, and if the lower limit of the thickness at the groove portion is 70 nm, the upper limit of the thickness at the groove portion is more preferably 150 nm, and further preferably 140 nm. Furthermore, if the upper limit of the thickness at the groove portion is 140 nm, the lower limit of the thickness at the groove portion is more preferably 70 nm, and further preferably 90 nm, and if the lower limit of the thickness at the groove portion is 90 nm, the upper limit of the thickness at the groove portion is more preferably 150 nm, and further preferably 140 nm.

For improvement of recording sensitivity and jitter, the thickness at the land portion is more preferably 90% or more of the thickness at the groove portion, and further preferably, these thicknesses are approximately the same as each other.

The dye recording layer 12 can be formed by dissolving a discoloration inhibitor and binder and the like as necessary, as well as the above-mentioned organic dye, into a solvent to prepare an application solution, then applying this application solution onto the surface of the transparent substrate on which grooves are formed to form a coating film, and drying the thus formed coating film. For forming a thin film, the concentration of the dye in the application solution is preferably in a range from 0.5 to 1.5 g/10 ml, and more preferably in a range from 0.6 to 1.2 g/100 ml. By use of an application solution having a high dye concentration, a dye recording layer having a thin, uniform thickness can be obtained.

Examples of the application method include a spraying method, spin coating method, dipping method, roll coating method, blade coating method, doctor roll method, screen printing method and the like. In the case of forming the dye recording layer by the spin coating method, a dye recording layer thin film can be formed using a conventionally known spin coating application apparatus. The amount of an application solution supplied for one disc is preferably from 0.1 to 1 ml, and more preferably from 0.2 to 0.5 ml. A speed of rotation during supply of the application solution is preferably from 100 to 500 rpm, and more preferably from 200 to 400 rpm. After supply of the application solution, drying is conducted while the speed of rotation gradually increases. The speed of rotation during drying is preferably from 1500 to 8000 rpm, more preferably from 2000 to 6000 rpm, and particularly preferably from 3000 to 5000 rpm. The acceleration when increasing the speed of rotation is preferably in a range from 10 to 3000 rpm/s, and more preferably in a range from 50 to 1000 rpm/s. If the duration from the commencement of application to the completion of drying is too short, uniform film thickness distribution will not be obtained, and if the duration is too long, productivity will decrease. Therefore, this duration is preferably from 3 to 15 seconds, and more preferably from 5 to 10 seconds. By conducting spin coating under the above-described conditions, a thin film having a thickness of 160 nm or less can be formed uniformly on the land portion and groove portion.

As the application solvent, esters such as butyl acetate, cellosolve acetate and the like; ketones such as methyl ethyl ketone, cyclohexanone, methyl isobutyl ketone and the like; chlorinated hydrocarbons such as dichloromethane, 1,2-dichloroethane, chloroform and the like; amides such as dimethylformamide and the like; hydrocarbons such as cyclohexane and the like; ethers such as tetrahydrofuran, ethyl ether, dioxane and the like; alcohols such as ethanol, n-propanol, isopropanol, n-butanol, diacetone alcohol and the like; fluorine-based solvents such as 2,2,3,3-tetrafluoropropanol and the like; glycol ethers such as ethylene glycol monomethyl ether (methyl cellosolve), ethylene glycol monoethyl ether (ethyl cellosolve), ethylene glycol monopropyl ether, propylene glycol monomethyl ether, propylene glycol monoethyl ether, propylene glycol monopropyl ether, methylene glycol monomethyl ether, methylene glycol monoethyl ether, methylene glycol monopropyl ether and the like; and the like are listed.

The above-mentioned solvents can be used alone or in a combination of two or more, in view of solubility therein of compounds that are used. For forming a coating film having uniform thickness, it is preferable to use a mixed solvent, which is prepared by mixing a main solvent, which may be a fluorine-based solvent such as 2,2,3,3-tetrafluoropropanol or the like or an alcohol such as diacetone alcohol or the like, with a glycol ether, such as propylene glycol monomethyl ether or the like, which is at a proportion of 1 to 80% by volume, and desirably from 3 to 50% by volume relative to the main solvent. Among such mixed solvents, a combination of 2,2,3,3-tetrafluoropropanol with propylene glycol monomethyl ether, a combination of 2,2,3,3-tetrafluoropropanol with propylene glycol monoethyl ether, and a combination of 2,2,3,3-tetrafluoropropanol with propylene glycol monopropyl ether are particularly preferable. Various additives such as antioxidants, UV absorbers, plasticizers, lubricants and the like may be further added to the application solution, depending on objectives.

As typical examples of the discoloration inhibitor, nitroso compounds, metal complexes, diammonium salts and aluminum salts are listed. Examples of these compounds are described in publications such as, for example, JP-A Nos. 2-300288, 3-224793 and 4-146189, and the like.

In the present invention, a discoloration inhibitor of the following general formula (1) is preferable.

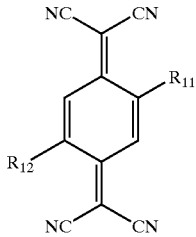

General formula (1)

In the general formula (1), each of $R^{11}$ and $R^{12}$ independently represents a hydrogen atom or a mono-valent substituent. The substituent represented by $R^{11}$ or $R^{12}$ can be a substituent obtained by combining a halogen atom or a carbon, oxygen, nitrogen or sulfur atom with, specifically, an alkyl group, alkenyl group, aralkyl group, aryl group, heterocyclic group, halogen atom, cyano group, nitro group, mercapto group, hydroxyl group, alkoxy group, aryloxy group, alkylthio group, arylthio group, acyloxy group, amino group, alkylamino group, amide group, sulfonamide group, sulfamoylamino group, alkoxycarbonylamino group, alkoxysulfonylamino group, ureido group, thioureido group, acyl group, alkoxycarbonyl group, carbamoyl group, alkylsulfonyl group, alkylsulfinyl group, sulfamoyl group, carboxyl group (including salts) or sulfo groups (including salts). These may also be further substituted with these substituents.

Each of $R^{11}$ and $R^{12}$ preferably independently represents a hydrogen atom, alkyl group having 1 to 6 carbon atoms, halogen atom, cyano group, alkoxy group having 1 to 6 carbon atoms, alkylthio group having 1 to 6 carbon atoms, amide group having 1 to 6 carbon atoms, sulfonamide group having 1 to 6 carbon atoms, ureido group having 1 to 6 carbon atoms, acyl group having 1 to 6 carbon atoms, alkoxycarbonyl group having 2 to 6 carbon atoms, carbamoyl group having 1 to 6 carbon atoms, alkylsulfonyl group having 1 to 6 carbon atoms or alkylsulfinyl group having 1 to 6 carbon atoms, more preferably an alkoxy group having 4 or less carbon atoms, and particularly preferably a methoxy group or ethoxy group.

In a case of use of a discoloration inhibitor, the used amount thereof is usually in a range from 0.1 to 50% by mass, preferably from 0.5 to 45% by mass, further preferably from 3 to 40% by mass, and particularly preferably from 5 to 25% by mass, relative to the amount of the dye.

As examples of the binder, natural organic polymer substances such as gelatin, cellulose derivatives, dextran; rosin, rubber and the like; hydrocarbon-based resins such as polyurethane, polyethylene, polypropylene, polystyrene, polyisobutylene and the like; vinyl-based resins such as polyvinyl chloride, polyvinylidene chloride, polyvinyl chloride-polyvinyl acetate copolymer and the like; acrylic resins such as methyl polyacrylate, polymethyl methacrylate and the like; and synthetic organic polymers such as initial condensates of thermosetting resins such as polyvinyl alcohol, chlorinated polyethylene, epoxy resins, butyral resins, rubber derivatives, phenol-formaldehyde resins and the like are listed. When the binder is combined for use in the material for the dye recording layer, the amount of the binder used is from 0.2 to 20 parts by mass, preferably from 0.5 to 10 parts by mass, and further preferably from 1 to 5 parts by mass, for 100 parts by mass of the dye.

Further, an intermediate layer may also be provided, for improvement of reflectance and sensitivity, between the dye recording layer 12 and the light reflection layer 14. As a material used in the intermediate layer, inorganic substances such as $SiO_2$, SiN, $MgF_2$, $TiO_2$ and the like, and organic substances such as butadiene rubber and the like are listed. This intermediate layer can be formed by utilizing vacuum film formation, spin coating or the like.

The light reflection layer 14 is provided on the dye recording layer 12 for the purpose of improving reflectance. The material of the light reflection layer 14 may advantageously be a light-reflective substance showing high reflectance for laser light. The reflectance of the material is preferably 30% or more, more preferably 50% or more, and further preferably 70% or more. Examples thereof include metals and metalloids such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and the like, and stainless steel. Of these, Cr, Ni, Pt, Cu, Ag, Au, Al and stainless steel are preferable. These substances may be used alone or in a combination of two or more. Further, alloys thereof can also be used. As the material of the light reflection layer 14, Au, Ag, Al and alloys thereof are particularly preferable. The light reflection layer 14 can be formed, for example, by vapor-depositing, sputtering or ion plating this light-reflective substance onto the dye recording layer 12. The thickness of the light reflection layer 14 is usually from 10 to 800 nm, preferably from 20 to 500 nm, and further preferably from 50 to 300 nm.

A protective layer 16 is provided on the light reflection layer 14 for purposes of physically and chemically protecting the dye recording layer and the like. The same protective layer may also be provided on the side of the transparent substrate 10 at which the dye recording layer 12 is not provided, for purposes of enhancing scratch resistance and humidity resistance. As a material used in the protective layer 16, for example, inorganic substances such as SiO, $SiO_2$, $MgF_2$, $SnO_2$, $Si_3N_4$ and the like, and organic substances such as thermoplastic resins, thermosetting resins, UV hardening resins and the like are listed.

The protective layer 16 can be formed, for example, by laminating a film obtained by extrusion-working of a plastic onto the light reflection layer 14 and/or the transparent substrate 10 via an adhesive layer. Alternatively, the protective layer 16 may be provided by a method such as vacuum deposition, sputtering, application or the like. Further, in cases of thermoplastic resins and thermosetting resins, these may be dissolved in a suitable solvent to prepare an application solution, and then this application solution can be applied and dried to form the protective layer 16. In a case of a UV hardening resin, the protective layer 16 can be formed by applying the resin itself or by dissolving the resin in a suitable solvent to prepare an application solution, applying the solution, and irradiating the solution with UV light for hardening. In this application solution, various additives, such as antistatic agents, antioxidants, UV absorbers and the like, may also be added, depending on objectives.

To prevent irregular spreading of pits toward the protective layer, the hardness of the protective layer 16 is preferably F or more, and more preferably H or more, in terms of scratch hardness of pencils. The thickness of the protective layer is preferably in a range from 2.5 to 23 $\mu$m, more preferably from 3.5 to 20 $\mu$m, and further preferably from 4.0 to 15 $\mu$m.

Further, an intermediate layer may also be provided between the light reflection layer 14 and the protective layer 16, for control of optical properties such as improving reflectance or the like. As a material used in this intermediate layer, for example, inorganic substances such as SiO, $SiO_2$, $MgF_2$, $SnO_2$, $Si_3N_4$ and the like are listed. This intermediate layer can be formed by vacuum film formation, such as vapor deposition, sputtering or the like.

Recording of data on the above-mentioned optical data recording medium may be conducted, for example, as follows. The optical data recording medium of the present invention can be used for recording at 1×speed (1.2 to 1.4 m/sec.) in the case of usual CD format, and can also be used for high-speed recording, at 4×, 6×, and higher speeds. First, a optical data recording medium is irradiated from a substrate side with recording light, such as semiconductor laser light or the like, while being rotated at a predetermined linear velocity (in the case of CD format, 1.2 to 1.4 m/sec.) or at a predetermined constant angular velocity. By this irradiation with light, the dye recording layer absorbs the light, which causes a local increase in temperature. Thus, for example, pits are formed, and by changing an optical property at the pits, data is recorded. Reproduction of the data recorded as described above may be conducted by irradiating the optical data recording medium from the substrate side with semiconductor laser light, while rotating the medium at a predetermined constant linear velocity, and detecting light reflected from the medium.

As described above, the CD-R type optical data recording medium of the present embodiment can provide both excellent recording sensitivity and excellent recording property (jitter) by satisfaction of three conditions: (1) the depth of the pre-groove formed at the transparent substrate is from 20 to 100 nm, (2) the thickness of the dye recording layer at the groove portion is from 50 to 160 nm, and (3) the thickness of the dye recording layer at the land portion is at least 80% of the thickness at the groove portion. That is, even if the thickness of the dye recording layer is as small as 50 to 160 nm, data can be recorded with excellent recording sensitivity. Also, excellent jitter can be obtained by controlling the depth of the pre-groove formed in the transparent substrate to from 20 to 100 nm and controlling the thickness at the land portion to 80% or more of the thickness at the groove portion, such that the difference between the thickness at the land portion and the thickness at the groove portion is small.

Furthermore, by decreasing the thickness of the dye recording layer, the time required for forming the dye recording layer (for example, the time required for application and drying, for spin coating or the like) is shortened, and production efficiency of the optical data recording medium can be improved, leading to a lowering of costs. Further, since the depth of the pre-groove is shallower than in conventional structures, formation of the substrate is easy.

Although an example of a CD-R type optical data recording medium equipped with a light reflection layer and a protective layer has been illustrated above, these layers are optional constituent components, and a structure not including such layers can also be adopted.

Further, an example of a CD-R type optical data recording medium has been illustrated above, but the optical data recording medium of the present invention can also be applied to a DVD-R type optical data recording medium, which can effect recording at higher density. A DVD-R type optical data recording medium has basically the same constitution as a CD-R type optical data recording medium, except that the track pitch of pre-grooves formed on a transparent substrate, being 0.6 to 0.9 μm, is narrower than in the CD-R type.

Additionally, a DVD-R type optical data recording medium with a laminated structure including two dye recording layers can be obtained by preparing two laminates formed in the same manner as the above-mentioned CD-R type optical data recording medium, each composed of a transparent substrate, dye recording layer, light reflection layer and protective layer, and pasting the two laminates together with an adhesive or the like such that the dye recording layers of the respective laminates are at the inside. Also, a DVD-R type optical data recording medium that has a dye recording layer at only one surface can be produced by pasting a laminate and a protective substrate, in the form of a disc having approximately the same dimensions as the substrate of the laminate, together with an adhesive or the like such that the dye recording layer is at the inside. In the case of a laminated structure, a transparent substrate having a diameter of 120±3 mm and a thickness of 0.6±0.1 mm is usually used, and the thickness of the optical data recording medium after lamination is controlled to be 1.2±0.2 mm.

When the optical data recording medium of the present invention is used as a DVD-R type medium, the effects of the present invention are further manifested. Namely, in the case of a DVD-R type medium, recording at a further higher density than with a medium of CD-R type is required, and the present invention is suitable for recording at higher density because the thickness of the dye recording layer is much smaller than the thickness of a conventional dye recording layer.

EXAMPLES

The optical data recording medium of the present invention will be specifically illustrated below on the basis of Examples.

Example 1

A polycarbonate substrate (thickness: 1.2 mm, outer diameter: 120 mm, internal diameter: 15 mm, manufactured by Teijin Ltd., trade name: PANLITE AD5503) and including spiral pre-grooves formed on the surface was produced by injection molding. The depth of the pre-grooves was 50 nm, the width of these grooves was 500 nm, and the track pitch was 1600 nm.

2 g of the following dye (A) was dissolved in a mixed solvent obtained by mixing 100 ml of 2,2,3,3-tetrafluoro-1-propanol with 20 ml of propylene glycol monomethyl ether during irradiation with ultrasonic waves for 2 hours. This solution, an application solution for forming a dye recording layer, was applied to the pre-groove surface of the substrate by a spin coating method while a speed of rotation was changed from 300 to 3000 rpm, and the solution was dried to form the dye recording layer. The cross-section of the dye recording layer was determined with a scanning electron microscope (SEM). Measurements were effected and found that the thickness of the dye recording layer at a groove portion was 120 nm and the thickness at a land portion was 110 nm (92% of the thickness at the groove portion). An extinction coefficient k of the dye recording layer for laser light of 780 nm was 0.08.

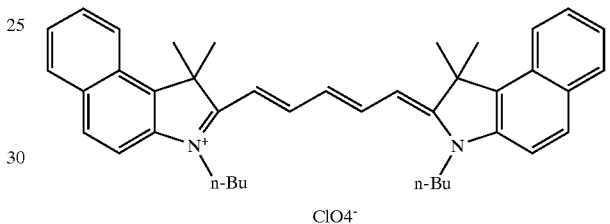

Dye (A)

Then, a light-reflection layer having a thickness of about 90 nm and composed of silver (Ag) was formed on the dye recording layer by DC sputtering in an argon atmosphere. Further, a UV hardening resin (trade name SD-318, manufactured by Dainippon Ink & Chemicals, Inc.) was applied to the light-reflection layer by spin coating while the speed of rotation was changed from 300 rpm to 4000 rpm. After this application, the resin was irradiated with ultraviolet radiation from a high pressure mercury lamp to harden the layer and form a protective layer having a thickness of 8 μm. The surface hardness of the protective layer was 2H in terms of pencil scratch hardness.

By the above-mentioned processes, a CD-R type optical disc of Example 1, composed of the substrate, dye recording layer, light reflection layer and protective layer, was produced.

Example 2

A CD-R type optical disc according to the present invention was produced in the same manner as in Example 1, except that the width of the pre-grooves was 580 nm.

Example 3

A CD-R type optical disc according to the present invention was produced in the same manner as in Example 1, except that the width of the pre-grooves was 420 nm and the solvent for the dye application solution was substituted with a single solvent, 2,2,3,3-tetrafluoro-1-propanol.

Example 4

A CD-R type optical disc according to the present invention was produced in the same manner as in Example 1, except that the thickness of the dye recording layer at the groove portion was 90 nm and the thickness at the land portion was 80 nm (89% of the thickness at the groove portion).

Example 5

A CD-R type optical disc according to the present invention was produced in the same manner as in Example 1, except that the thickness of the dye recording layer at the groove portion was 140 nm and the thickness at the land portion was 130 nm (93% of the thickness at the groove portion).

Example 6

A CD-R type optical disc according to the present invention was produced in the same manner as in Example 1, except that the depth of the pre-grooves was 60 nm.

Comparative Example 1

A CD-R type optical disc for comparison was produced in the same manner as in Example 1, except that the thickness of the dye recording layer at the groove portion was 30 nm.

Comparative Example 2

A CD-R type optical disc for comparison was produced in the same manner as in Example 1, except that the thickness of the dye recording layer at the groove portion was 180 nm, and the thickness at the land portion was 170 nm (94% of the thickness at the groove portion).

Comparative Example 3

A CD-R type optical disc for comparison was produced in the same manner as in Example 1, except that the thickness of the dye recording layer at the groove portion was 120 nm and the thickness at the land portion was 70 nm. Thus, the thickness of the dye recording layer at the groove portion was 59% of the thickness at the land portion.

Comparative Example 4

A CD-R type optical disc for comparison was produced in the same manner as in Example 1, except that the depth of the pre-grooves was 15 nm.

Comparative Example 5

A CD-R type optical disc for comparison was produced in the same manner as in Example 1, except that the depth of the pre-grooves was 175 nm.

Comparative Example 6

A CD-R type optical disc for comparison was produced in the same manner as in Example 1, except that the depth of the pre-grooves was 120 nm.

Evaluation as an Optical Disc

Recording was effected with the CD-R type optical discs of the above-mentioned Examples and Comparative Examples with laser light at a wavelength of 780 nm, using an evaluation machine "OMT2000" (manufactured by Pulstec Industrial Co., Ltd.). Then, 3T pit jitter was measured on the optical discs after recording. A lower value of 3T pit jitter means less dispersion of pits. If the value of jitter is 35 or less, recording and reproducing properties are considered to be excellent. Further, recording power when optimum jitter is manifested was measured. This recording power represents recording sensitivity, and if it is 8 mW or less, recording sensitivity is considered to be excellent. The results obtained are shown in Table 1.

TABLE 1

| | Extinction coefficient k of dye recording layer | Thickness of dye recording layer at groove portion (nm) | Thickness at land portion/ thickness at groove portion (%) | Depth of pre-groove (nm) | Width of pre-groove (nm) | Recording power (mW) | 3T pit jitter |
|---|---|---|---|---|---|---|---|
| Example | | | | | | | |
| 1 | 0.08 | 120 | 92 | 50 | 500 | 7.0 | 31 |
| 2 | 0.08 | 120 | 92 | 50 | 580 | 7.5 | 32 |
| 3 | 0.08 | 120 | 92 | 50 | 420 | 7.5 | 32 |
| 4 | 0.08 | 90 | 89 | 50 | 500 | 6.5 | 32 |
| 5 | 0.08 | 140 | 93 | 50 | 500 | 7.5 | 31 |
| 6 | 0.08 | 120 | 92 | 60 | 500 | 8.0 | 31 |
| Comparative Example | | | | | | | |
| 1 | 0.08 | 30 | 92 | 50 | 500 | — | — |
| 2 | 0.08 | 180 | 94 | 50 | 500 | 11.0 | 39 |
| 3 | 0.08 | 120 | 59 | 50 | 500 | * | * |
| 4 | 0.08 | 120 | 92 | 15 | 500 | * | * |
| 5 | 0.08 | 120 | 92 | 175 | 500 | 11.0 | 38 |
| 6 | 0.08 | 120 | 92 | 120 | 500 | 10.0 | 39 |

*Measurement was impossible due to poor tracking

The results in Table 1 show that in the case of the CD-R type optical disc according to the present invention (Examples 1 to 6), the values of 3T pit jitter were all small, being 32 or less, and excellent recording and reproduction properties were obtained. Also, recording powers thereof were all 8 mW or less, that is, recording sensitivity was excellent. On the other hand, it can be seen that in cases of CD-R type optical discs for comparison (Comparative Examples 2, 5 and 6), the values of 3T pit jitter were all large, 37 or more, and satisfactory recording and reproduction properties were not obtained. For example, digital signal reading errors tended to occur. Further, it can be seen that in these cases of CD-R type optical discs for comparison (Comparative Examples 2, 5 and 6), the recording power required was too large, and recording could not be carried out under usual recording conditions. When the thickness of the dye recording layer was too small(Comparative Example 1), laser light was not absorbed sufficiently, sensitivity decreased greatly, and formation of pits was difficult. When the thickness of the dye recording layer at the land portion was too small or the depth of the pre-grooves was too small(Comparative Examples 3 and 4), tracking could not be carried out sufficiently and recording was impossible.

The optical data recording medium of the present invention has the effects that both recording sensitivity is excellent and a recording property jitter) is excellent.

What is claimed is:

1. An optical data recording medium comprising:
    a transparent substrate at which a pre-groove having a depth of from 20 to 100 nm is formed; and
    a dye recording layer formed thereon, which has a groove portion whose thickness is from 50 to 160 nm, has a land portion whose thickness is at least 80% of the thickness at the groove portion, and includes organic dye which enables recording of data.

2. The optical data recording medium according to claim 1, wherein the optical data recording medium has a structure in which the dye recording layer, a light reflection layer and a protective layer are provided, in that order, on the transparent substrate, which is a disc having a center hole formed at a central portion.

3. The optical data recording medium according to claim 2, wherein an intermediate layer is provided between the layers.

4. The optical data recording medium according to claim 1, wherein width of the pre-groove is from 400 to 630 nm.

5. The optical data recording medium according to claim 1, wherein depth of the pre-groove is from 30 to 90 nm.

6. The optical data recording medium according to claim 5, wherein depth of the pre-groove is from 40 to 80 nm.

7. The optical data recording medium according to claim 1, wherein track pitch of the pre-groove is in a range from 0.1 to 50 μm.

8. The optical data recording medium according to claim 7, wherein track pitch of the pre-groove is in a range from 0.6 to 0.9 μm.

9. The optical data recording medium according to claim 1, wherein the thickness of the groove portion of the dye recording layer is in a range from 70 to 150 nm.

10. The optical data recording medium according to claim 9, wherein the thickness of the groove portion of the dye recording layer is in a range from 80 to 140 nm.

11. The optical data recording medium according to claim 1, wherein the thickness of the land portion is at least 90% of the thickness of the groove portion.

12. The optical data recording medium according to claim 11, wherein the thickness of the land portion is substantially the same as the thickness of the groove portion.

13. The optical data recording medium according to claim 1, wherein an extinction coefficient k of the dye recording layer, at a wavelength of a laser which is used for recording, is in a range from 0.05 to 0.15.

14. The optical data recording medium according to claim 1, wherein the organic dye included in the dye recording layer comprises at least one dye selected from the group consisting of azo-based dyes, phthalocyanine-based dyes, oxonol-based dyes and pyromethene-based dyes.

15. The optical data recording medium according to claim 2, wherein material of the light reflection layer includes a light-reflective substance, and the reflectance of the material with respect to a laser light is at least 30%.

16. The optical data recording medium according to claim 2, wherein thickness of the light reflection layer is in a range from 10 to 800 nm.

17. The optical data recording medium according to claim 2, wherein hardness of the protective layer is a pencil scratch hardness of at least F.

18. The optical data recording medium according to claim 2, wherein thickness of the protective layer is in a range from 2.5 to 23 μm.

19. An optical data recording medium produced by a process comprising the steps of:
    applying an application solution which contains organic dye to a surface of a transparent substrate at which a pre-groove having a depth of from 20 to 100 nm is formed, for forming a coating film; and
    drying the coating film that is formed, to form a dye recording layer that has a thickness at a groove portion of from 50 to 160 nm and a thickness at a land portion of at least 80% of the thickness at the groove portion.

20. The optical data recording medium according to claim 19, wherein a concentration of dye in the application solution is from 0.5 to 1.5 g/100 ml.

* * * * *